US012592615B2

(12) United States Patent
Wang et al.

(10) Patent No.: US 12,592,615 B2
(45) Date of Patent: Mar. 31, 2026

(54) FILTER TO SUPPRESS CURRENT CIRCULATION IN ROTATING ELECTRICAL MACHINE

(71) Applicant: BorgWarner Inc., Auburn Hills, MI (US)

(72) Inventors: Wei Wang, Fort Wayne, IN (US); Cong Ma, Fisher, IN (US)

(73) Assignee: BorgWarner Inc., Auburn Hills, MI (US)

( * ) Notice: Subject to any disclaimer, the term of this patent is extended or adjusted under 35 U.S.C. 154(b) by 298 days.

(21) Appl. No.: 18/377,027

(22) Filed: Oct. 5, 2023

(65) Prior Publication Data

US 2025/0119027 A1 Apr. 10, 2025

(51) Int. Cl.
*H02K 11/02* (2016.01)
*B60L 50/51* (2019.01)
*H02K 1/16* (2006.01)

(52) U.S. Cl.
CPC .............. *H02K 11/02* (2013.01); *B60L 50/51* (2019.02); *H02K 1/16* (2013.01); *B60L 2220/14* (2013.01)

(58) Field of Classification Search
USPC ........................................................ 310/68 R
See application file for complete search history.

(56) References Cited

U.S. PATENT DOCUMENTS

2017/0260851 A1* 9/2017 Rendusara .............. F04D 13/10
2022/0009643 A1* 1/2022 Datta ........................ H02J 1/10

* cited by examiner

*Primary Examiner* — Oluseye Iwarere
*Assistant Examiner* — Minki Chang
(74) *Attorney, Agent, or Firm* — Reising Ethington P.C.

(57) ABSTRACT
A three-phase alternating current (AC) synchronous machine including a stator having a plurality of stator slots; a plurality of stator windings arranged in a Delta connection and received within the stator slots; and a common mode filter included with the stator, wherein filter windings from the common mode filter are circumferentially wound around a magnetic core of the common mode filter and are serial connected to the stator windings.

9 Claims, 4 Drawing Sheets

FILTER TO SUPPRESS CURRENT CIRCULATION IN ROTATING ELECTRICAL MACHINE

TECHNICAL FIELD

The present application relates to rotating electrical machines and, more particularly, to three phase AC synchronous machines including wound rotor synchronous machines and permanent magnet synchronous machines.

BACKGROUND

Rotating electrical machines, also sometimes referred to as electric motors, generally include a stator having a plurality of electrical windings and a rotor that can be angularly displaced relative to the stator in response to electrical current flowing through the windings. The rotating electrical machines can exist in any one of a variety of different implementations. For instance, the rotating electrical machines can be implemented as a three-phase permanent magnet synchronous machine. This implementation of the rotating electrical machine can be electrically coupled to a power source in a variety of different ways. That is, the windings of the rotating electrical machine can be coupled to the power source using a Wye connection or a Delta connection. Depending on the connection, a number of challenges may exist with respect to the existence of a circulation current in the windings.

SUMMARY

In one implementation, a three-phase alternating current (AC) synchronous machine including a stator having a plurality of stator slots; a plurality of stator windings arranged in a Delta connection and received within the stator slots; and a common mode filter included with the stator, wherein filter windings from the common mode filter are circumferentially wound around a magnetic core of the common mode filter and are serial connected to the stator windings.

In another implementation, a three-phase AC synchronous machine includes a stator having a plurality of stator slots and a back iron area positioned axially-outwardly from the plurality of stator slots; a plurality of stator windings arranged in a Delta connection and received within the stator slots; and a common mode filter, including a magnetic core positioned adjacent to an exterior surface of the stator, wherein filter windings from the common mode filter are circumferentially wound around the magnetic core and are serial connected to the plurality of stator windings.

In yet another implementation, a three-phase AC synchronous machine includes a stator having a plurality of stator slots and a back iron area positioned radially-outwardly from the plurality of stator slots; a plurality of stator windings arranged in a Delta connection and received within the stator slots; and a common mode filter, including a magnetic core integrated with the stator, wherein filter windings from the common mode filter wrap around the stator and are serial connected to the plurality of stator windings.

DETAILED DESCRIPTION

Figure 1:
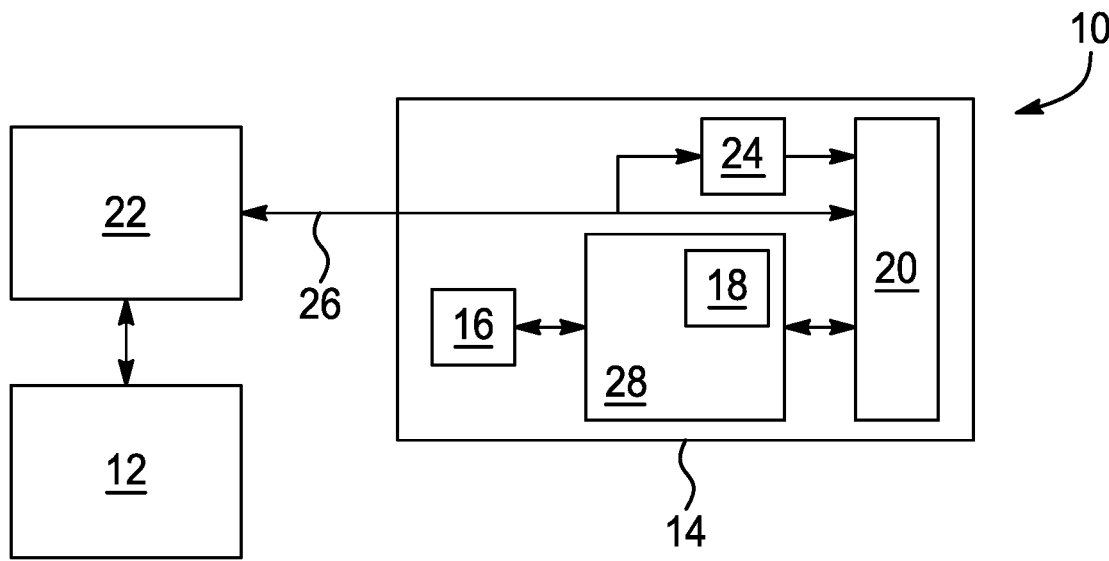
FIG. 1 is a block diagram depicting an implementation of an electrical system in which a three-phase AC synchronous machine is included.

A rotating electrical machine, or electric motor, can have windings that are electrically coupled to an electrical power source and an inverter via a Delta connection, rather than a Wye connection. The use of the Delta connection with the rotating electrical machine rather than the Wye connection can involve the existence of a circulation current in the winding given that the Delta connection forms a closed loop for harmonics voltage and current. While three-phase AC synchronous machine implementations of rotating electrical machines commonly use windings having Wye connections, certain implementations of three-phase AC synchronous machines may involve a specific input voltage or current, a specified winding turn value, and/or an economic rationale making the Delta connection preferable. For example, electric motors having a relatively high power rating and/or receiving a specific input voltage/current may benefit from the Delta connection. The Delta connection can also help optimize turn count for hairpin or S-wound stator windings. However, the Delta connection may include—a circulation current from voltage harmonics that can result in torque ripple, reduced output torque, and/or reduced efficiency.

The dominant harmonic voltages in permanent magnet and wound rotor synchronous machines are third harmonics and multiples of the third harmonics. The third harmonic voltages from three-phase stator windings can exist at the same phase and magnitude. These harmonic voltages can cancel each other out to be net zero when the stator windings are configured as a Wye connection. But stator windings configured in a Delta connection can result in harmonic voltages additive to each other thereby resulting in an unwanted circulation current within the windings.

The circulation current in the Delta connection can be reduced or eliminated using a common mode filter that electrically connects to the stator windings arranged in a Delta connection. The common mode filter can be implemented in a variety of different ways, but the stator windings can be electrically connected to filter windings wrapped around a magnetic core of the common mode filter such that the windings are wound around the filter and arranged in series. The common mode filter comprises the magnetic core as well as filter windings that wrap around the magnetic core. The quantity of turns around the common mode filter for each winding can vary and depend on the application. The third harmonic circulation current is of the same magnitude and phase, thus, a common mode current. The base harmonic three-phase current exists at different phase angles such that the sum of these currents equals zero. The common model filter has little to no magnetic inductance for base harmonic of three phase current due to its zero sum value, but has a very high inductance for the common mode current. The common mode filter will not affect the base harmonic three phase current and will suppress the circulation current. An implementation of a rotating electrical machine with a common mode filter and Delta-connected stator windings will be described below with reference to an application in a battery electric vehicle (BEV), however, it should be appreciated that other implementations are possible.

Turning to FIG. 1, an implementation of an electrical system 10 is shown including an electrical grid 12 and an electric vehicle (EV) 14 that can either receive electrical power from or provide electrical power to the grid 12. The electrical grid 12 can include any one of a number of electrical power generators and electrical delivery mechanisms. Electrical generators (not shown) create AC electrical power that can then be transmitted a significant distance away from the electrical generator for residential and commercial use. The electrical generator can couple with the electrical grid 12 that transmits the AC electrical power from the electrical generator to an end user, such as a residence or business. As the AC electrical power is provided to the electrical grid 12, the electrical power can exist at a relatively high voltage so that it can be transmitted relatively long distances. Once the electrical power reaches a location where it is intended to be used, electrical transformers (not shown) can be used to reduce the voltage level before ultimately being provided to a residence or business. In one implementation, the voltage level of AC electrical power used is 360-510 volts RMS alternating current three-phase, 50-60 hz. However, this voltage range can be different.

The EV 14 can include an electric motor 16 that wholly, or at least partially, propels the vehicle. In the described implementation, the electric motor 16 can be a three-phase alternating current (AC) synchronous machine, but other implementations are possible using the controller and functionality described herein. The rotor could be a permanent magnet rotor or a wound rotor. Generally speaking, the electric motor 16 can have a voltage rating greater than 200V. For example, the electric motor 16 can be a high-voltage hairpin (HVH) electric motor having a voltage rating of 800V and 245-400 kW of power. The electric motor 16 includes a stator having slots that receive stator windings and a rotor that is angularly displaced relative to the stator in response to the flow of electrical current through the stator windings. A three-phase power inverter 18 can be electrically coupled to an EV battery 20 and the electric motor 16. The power inverter can receive DC electrical power from the EV battery 20 and invert the DC electrical power into three-phase AC electrical power before supplying the AC electrical power to the electric motor 16. The amount of voltage supplied by the EV battery to the electric motor can vary by application. The term "electric vehicle" or "EV" can refer to vehicles that are propelled, either wholly or partially, by electric motors. EV can refer to electric vehicles, plug-in electric vehicles, hybrid-electric vehicles, and battery-powered vehicles.

An EV charging station, referred to here as a DC fast charger 22, can receive AC electrical power from the grid 12, rectify the AC electrical voltage into DC electrical power, and provide the DC electrical power to the EV 14. The DC fast charger 22 can be geographically fixed, such as a charging station located in a vehicle garage or in a vehicle parking lot. The DC fast charger 22 can include an input terminal that receives the AC electrical power from the grid 12 and communicates the AC electrical power to the EV battery 20 directly, bypassing an on-board vehicle battery charger 24 included on the EV 14. An electrical cable 26 can detachably connect with an electrical receptacle on the EV 14 and electrically link the DC fast charger 22 with the EV

14 so that DC electrical power can be communicated between the DC fast charger 22 and the EV battery 20. One type of DC fast charging may be referred to as Level 3 EV charging, considered to be 60-350 kW. However, other charging standards and power levels are possible with the structure and functionality disclosed here. The EV battery 20 can supply DC electrical power controlled by power electronics to the electric motor 16 that propels the EV 14. The EV battery 20 or batteries are rechargeable. Examples of the battery include lead-acid batteries, nickel cadmium (NiCd), nickel metal hydride, lithium-ion, and lithium polymer batteries. However, battery technology is evolving and other chemistries and/or voltages may be used. A typical range of vehicle battery voltages can range from 100 to 1000V of DC electrical power (VDC).

Figure 2:
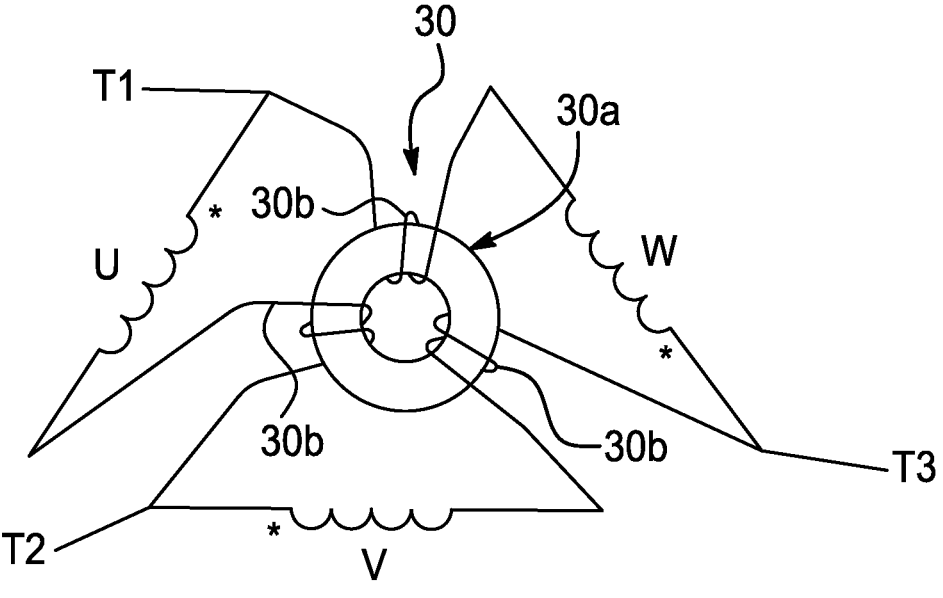
FIG. 2 is a perspective view depicting an implementation of a common mode filter.

Turning to FIG. 2, a general schematic of a common mode filter 30 is shown with a magnetic core 30a and three filter windings 30b that are serial connected with three-phase stator windings (U, V, W) included with the electric motor 16. The common mode filter includes the magnetic core 30a and filter windings 30b wrapped around the magnetic core 30a. The filter windings 30b can include three separate windings that are wound in the same direction as the stator windings (U, V, W) and each of the three filter windings 30b can individually connect to a phase of the windings. The magnetic core 30a can be a loop of iron around which the filter windings 30b are wound. However, the magnetic core 30a can be formed from any one of a variety of different materials, such as powder core, ferrite, iron lamination, or other type of soft magnetic material. The three-phase stator windings are electrically arranged within the stator of the electric motor 16 in a Delta connection, rather than in a Wye connection. The Delta connection involves three individual stator windings (U, V, W) that are electrically connected together in a loop and does not have a neutral wire unlike the Wye connection. The Delta arrangement can yield a circulation current that includes third harmonic currents in each of the stator windings (U, V, W). In contrast, in a Wye arrangement, the vectors of the third harmonic voltage in each phase of the stator windings are the same and cancel each other out such that no circulation current due to third harmonic exists. However, in the Delta connection, the vectors of the third harmonic voltage are additive in the formed Delta loop such that a circulation current exists. The quantity of windings and gauge of the windings can vary depending on the implementations.

Figure 3:
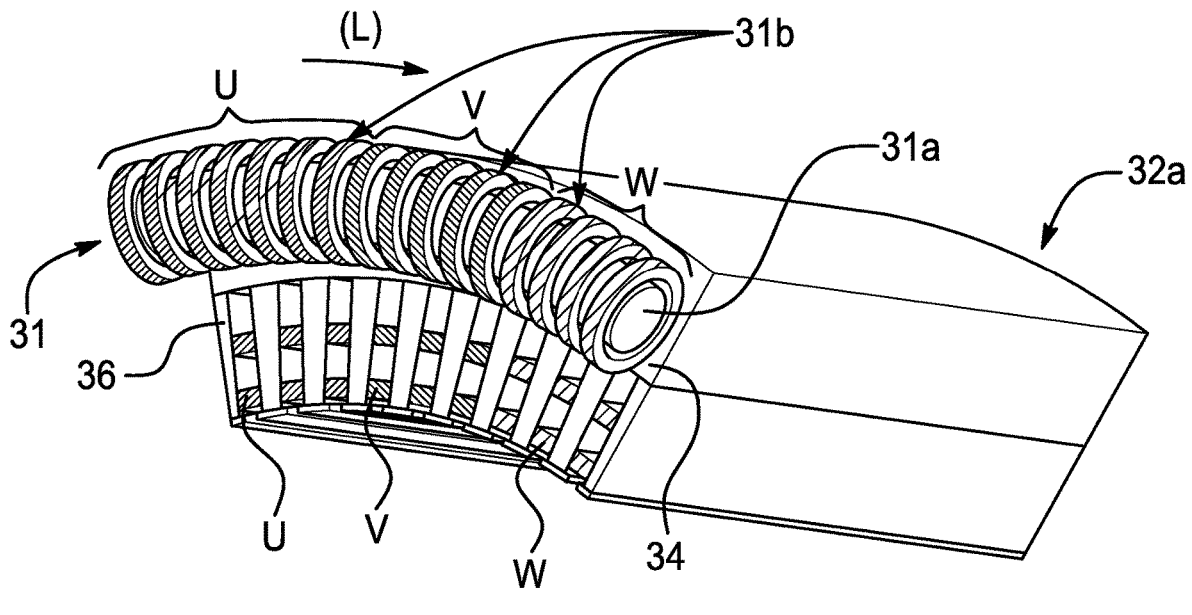
FIG. 3 is a perspective view depicting another implementation of a common mode filter.

FIG. 3 depicts a partial view of another implementation of a common mode filter 31 as it is coupled with a stator 32a of the electric motor 16. It is one pole section of a multiple pole motor. The common mode filter 31 includes a magnetic core 31a and filter windings 31b wrapped around the magnetic core 31a. The stator 32a includes stator slots 36 that receive three stator windings (U, V, W). The magnetic core 31a is shown as a single unitary structure with a length of three filter windings 31b extending away from a radially-extending surface 34 of the stator—32a and wound around an outer circumference of the common mode filter core 31a. The filter windings 31b can each serial connect with one of the stator windings (U, V, W). A length of the filter windings 31b—electrically connected to the U stator winding can wind around the magnetic core 31a for a circumferential length (L), a length of the filter windings 31b—electrically connected to the V stator winding can wind around the magnetic core 31a for an adjacent circumferential length of the common mode filter 31, and a length of the filter windings 31b—electrically connected to the W stator winding can wind around the magnetic core 31a for a circumferential length of the common mode filter 31 adjacent to the length of the V winding. The filter winding arrangement is flexible as long as the filter windings for each phase has an equal number of turns. In this implementation, the common mode filter 31 can be attached to a radially extending surface 34 of the stator 32a as a single unitary element with a relatively circular cross-sectional shape. However, it should be appreciated that other implementations are possible in which different cross-sectional shapes are chosen or a plurality of common mode filters can be attached to the stator.

Figure 4:
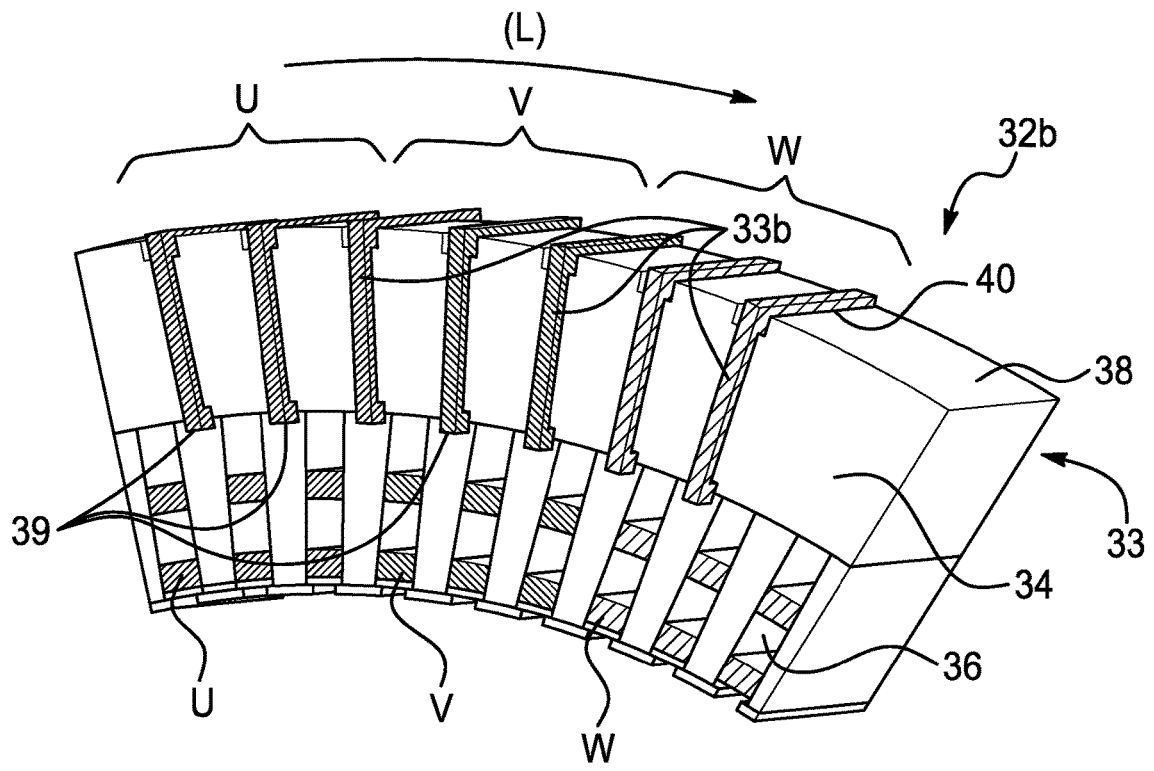
FIG. 4 is a perspective view depicting another implementation of a common mode filter.

FIG. 4 depicts partial view of an implementation of a common mode filter 33 that is integrated with a back iron section 38 of the stator 32b. It is one pole section of a multiple pole motor. The stator 32b includes a plurality of stator slots 36, a back iron area 38, and a plurality of apertures 39 at the joint of stator teeth and stator back iron—for receiving filter wires. The common mode filter 33 uses the back iron area 38 as a magnetic core, and includes filter wires 33b. A plurality of grooves 40 can be formed on the back iron area 38 and extend axially in a direction substantially parallel to the slots 36. Three filter windings 33b can be wrapped around the back iron area 38 of the stator 32b, passing through the apertures 39 and fitting in the grooves 40. A length of the filter windings 31b wrap around the back iron area 38 and connected to the U stator winding for a circumferential length (L), a length of the filter windings—33b wrap around the back iron area 38 and connected to the V stator winding for a circumferential length (L), and length of the filter windings—33b wrap around the back iron area 38 and connected to the W stator winding for a circumferential length (L).

Figures 5A, 5B:
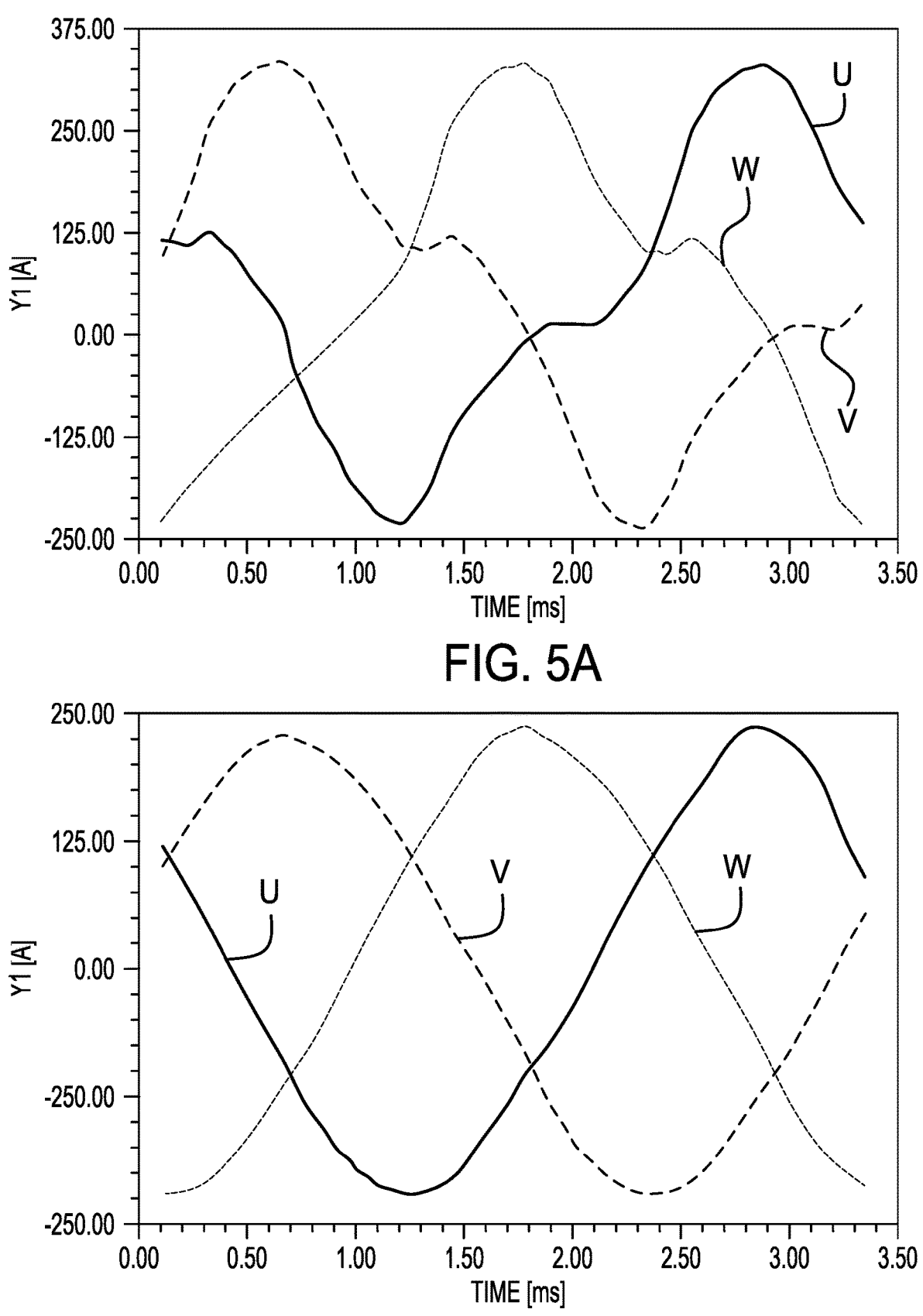
FIG. 5a-5b are graphs depicting current performance of a three-phase AC synchronous machine with and without a common mode filter.
Figures 6A, 6B:
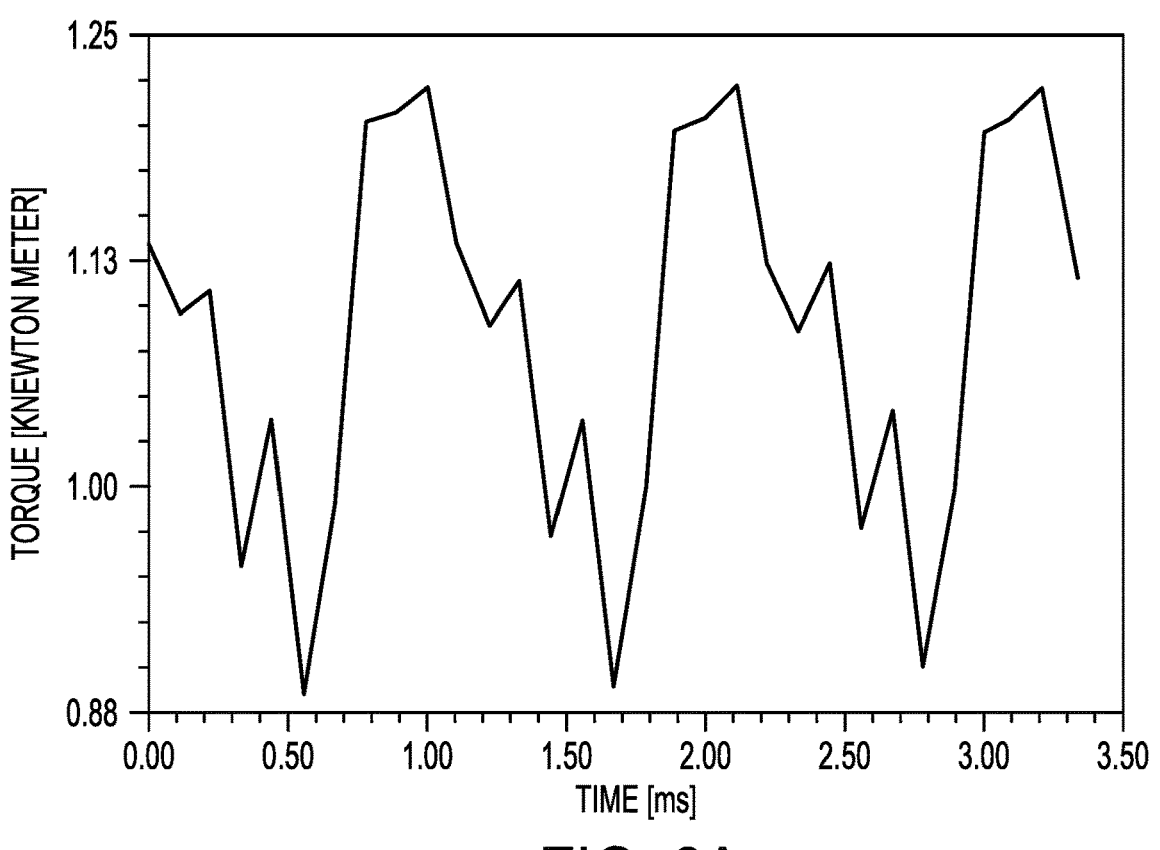
FIG. 6a-6b are graphs depicting torque performance of a three-phase AC synchronous machine with and without a common mode filter.

FIGS. 5-6 depict analysis results of electric motor operation with and without the common mode filter 30. FIG. 5a is a plot of simulated current in the stator windings (U, V, W) of the electric motor 16 without the common mode filter 30 over time while FIG. 5b is a plot of simulated current in the stator windings (U, V, W) of the electric motor 16 with the common mode filter 30 over time. FIG. 6a is a plot of simulated torque output of the electric motor 16 without the common mode filter 30 over time while FIG. 6b is a plot of simulated torque of the electric motor 16 with the common mode filter 30 over time. Before applying the common mode filter 30, the electric motor 16 output an average torque of 1084 Nm (337 Nm peak-to-peak ripple), and high third harmonic in phase current. After applying the common mode filter 30, the electric motor 16 output an average torque of 1148 Nm (135 Nm peak-to-peak ripple), and lower harmonics in phase current. The inclusion of the common mode filter 30 can yield a 20% copper loss reduction, 6% increase in torque output, and over 60% reduction in peak-to-peak torque ripple.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A three-phase alternating current (AC) synchronous machine, comprising:
   a stator having a plurality of stator slots and a back iron area positioned axially-outwardly from the plurality of stator slots;
   a plurality of stator windings arranged in a Delta connection and received within the stator slots; and
   a common mode filter, including a magnetic core positioned adjacent to an exterior surface of the stator, wherein filter windings from the common mode filter are circumferentially wound around the magnetic core and are serial connected to the plurality of stator windings.

2. The three-phase AC synchronous machine recited in claim 1, further comprising an electric vehicle (EV) operatively coupled to the three-phase alternating current (AC) synchronous machine.

3. The three-phase AC synchronous machine recited in claim 1, wherein the magnetic core of the common mode filter is a single unitary structure.

4. The three-phase AC synchronous machine recited in claim 1, wherein the magnetic core of the common mode filter is a coupled to a radially-extending surface of the stator.

5. The three-phase AC synchronous machine recited in claim 1, wherein the magnetic core of the common mode filter has a circular or rectangular cross-sectional shape.

6. The three-phase AC synchronous machine recited in claim 5, wherein the magnetic core of the common mode filter is ring-shaped.

7. A three-phase alternating current (AC) synchronous machine, comprising:
   a stator having a plurality of stator slots and a back iron area positioned radially-outwardly from the plurality of stator slots;
   a plurality of slots and apertures formed in the stator and shaped to receive filter windings wound around the stator;
   a plurality of stator windings arranged in a Delta connection and received within the stator slots; and
   a common mode filter, including a magnetic core integrated with the stator, wherein filter windings from the common mode filter wrap around the stator and are serial connected to the plurality of stator windings.

8. The three-phase AC synchronous machine recited in claim 7, further comprising an electric vehicle (EV) operatively coupled to the three-phase alternating current (AC) synchronous machine.

9. A three-phase alternating current (AC) synchronous machine, comprising:
   a stator having a plurality of stator slots and a back iron area positioned radially-outwardly from the plurality of stator slots;
   a plurality of stator windings arranged in a Delta connection and received within the stator slots; and
   a common mode filter, including a magnetic core integrated with the stator, wherein filter windings from the common mode filter wrap around the stator and are serial connected to the plurality of stator windings, wherein the filter windings are wound around the back iron area of the stator.

\* \* \* \* \*